Feb. 25, 1964   G. A. CROWE, JR   3,122,142
ABSORBENT PRODUCT
Filed May 27, 1963
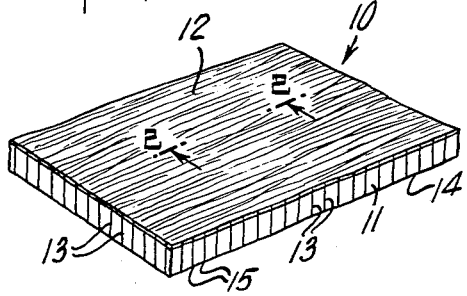
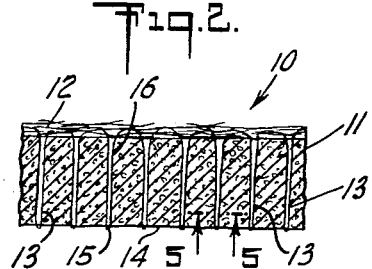
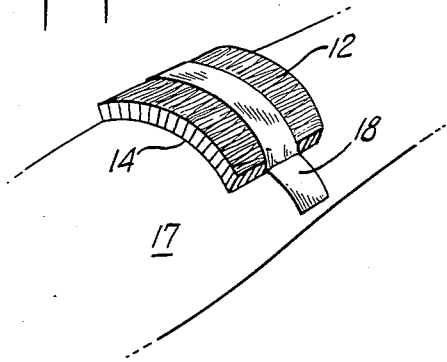
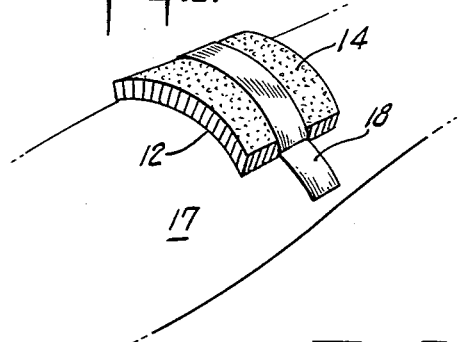
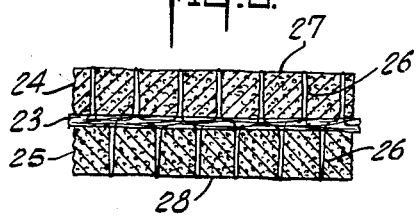
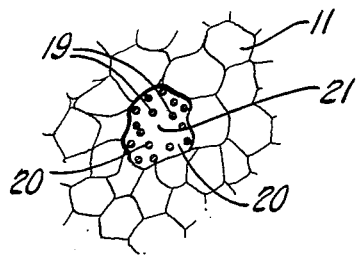
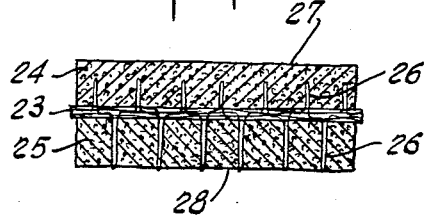
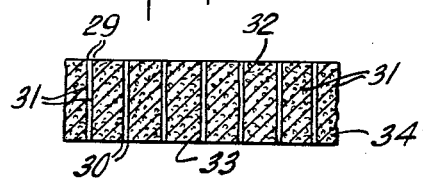
INVENTOR.
GEORGE A. CROWE JR.
BY Harold L. Warner
ATTORNEY

3,122,142
ABSORBENT PRODUCT
George A. Crowe, Jr., Plainfield, N.J., assignor to Johnson & Johnson, a corporation of New Jersey
Filed May 27, 1963, Ser. No. 283,485
20 Claims. (Cl. 128—296)

The present invention relates to resilient absorbent sheet materials and method of making the same.

Synthetic cellular sponge materials of varying types are presently available on the market. Many of these are quite soft and resilient and make excellent padding materials. However, many of the softer, more flexible and resilient cellular sponge materials, such, for example, as flexible and resilient sponges formed of polyurethane esters and polyurethane ethers, nylon, rubber, polyethylene, polyvinyl chloride, and other foamable synthetic resin materials, are hydrophobic in nature and will not readily absorb fluids with which they are placed in contact. In accordance with the present invention, advantage is taken of the hydrophobic nature of these sponge materials to prepare absorbent, resilient sheets having at least one surface which will not become soggy, such, for example, as does the surface of a wetted gauze dressing or the surface of a wetted absorbent fabric. In the absorbent materials of the present invention, aqueous-base fluids that come in contact with the hydrophobic sponge surface are removed from the surface. The sponge surface itself, because of its hydrophobic nature, remains relatively dry. According to the present invention, sheets of such resilient, flexible hydrophobic sponge materials are prepared with hydrophilic fibers which are uncoated by the material of the sponge and which extend through the sheet of cellular sponge material from one side thereof to the other. These fibers, which are present in the form of fiber bundles, contain capillary channels which extend along the same. These channels act to draw fluids from the surface of the sponge sheet into the main body thereof and through the sponge sheet, either to be evaporated or absorbed by an absorbent layer, as hereinafter more fully described. As a result of this structure, the surface of the absorbent product of the present invention, which contains the fiber bundle ends, consists of aqueous-base fluid-absorbing or fluid-transmitting areas, namely the bundle ends, separated by aqueous-base fluid-nonabsorbing, that is fluid-nontransmitting, areas, namely the cellular sponge through which the fiber bundles pass.

Where the cellular sponge material is referred to in the specification and claims as being hydrophobic in nature, it is intended to mean that the surface is not readily wetted by distilled water, and that when a drop of water at room temperature and normal atmospheric conditions is placed thereon, it will not be absorbed or wet out over the surface but remain for an extended period of time as a distinct globule of water resting on the surface of the sponge. The surface of the sponge may be hydrophobic because of the nature of the material from which the sponge is formed, such, for example, as where it is formed of polyurethane, or the surface may be made hydrophobic by treating the surface with a water repellent. By the terms "nonabsorbent surface" or "aqueous-base, fluid-nonabsorbing surface," where used in the specification and claims, is meant a surface that is hydrophobic in nature. Any open cellular sponge, even though formed of hydrophobic material, can, by compressing while immersed in water and then relaxed while still so immersed, be made to draw water into the sponge through the expansion of the compressed cells. However, such a sponge material will not absorb water where laid on a water surface without such compression and expansion and would have an aqueous-base fluid-nonabsorbing surface as defined.

The materials of the present invention may be used for any purpose where a resilient, highly absorbent sheet material is needed. However, sheet materials of the present invention are particularly useful in the preparation of surgical dressings and the like and will be hereinafter described primarily in this connection.

In the treatment of wounds, it is generally desirable to protect the wound with a protective covering that will draw wound exudate away from the wound surface and will, at the same time, form a protective cushion over the wound. It is also desirable to leave the wound site relatively dry. Where the wound is of such nature that there is copious wound exudate, heavy gauze dressings formed of many layers of gauze are generally used in order to remove and absorb such exudate so as to keep the wound area free of the same. However, as previously indicated, such gauze dressings in absorbing the wound exudate themselves become thoroughly wetted, with the result that a wet soggy dressing remains in contact with the wound. Also, as the wound exudate dries in the dressing, the dressing tends to become stiff and irritating.

Resilient, flexible synthetic sponge materials of the type referred to when used to cover a wound will provide an excellent cushioning protective cover. However, such materials do not of themselves satisfactorily remove fluids from an underlying surface with which they are placed in contact and are, accordingly, unsuitable for use as dressing materials in the place of the conventional gauze or other absorbent dressings. However, where provided with hydrophilic fiber bundles, as hereinafter more fully described, the wound exudate is conducted away from the wound surface. As the sponge material itself is relatively nonabsorbent, the sponge surface does not become soggy or impregnated with the wound exudate. As a result, the wound surface is kept relatively dry and the sponge material retains its soft cushioning characteristics.

It has heretofore been proposed to blend fibers of different types with a foamable material and to then subject the material to conditions that will foam the same to form a cellular sheet containing reinforcing fibers therein. Such products, however, are entirely different from the products of the present invention. In such products, the individual fibers are coated with the sponge-forming material and serve only to strengthen the same and/or give added bulk. In the products of the present invention, however, the fibers, extending as fiber bundles through the sponge sheet from the surface thereof, are not only hydrophilic in nature but are also uncoated by the hydrophobic material from which the cellular sponge is formed, so that they readily draw fluids from the surface of the sponge sheet up into the main body of the same.

The sheet of cellular sponge material may or may not be provided with an absorbent layer, though in the preferred practice of the present invention such absorbent layer is used. Also, such absorbent layer may consist in whole or in part of fibers similar to those which extend down into the sponge body or may consist entirely of some other absorbent material, such, for example, as a highly absorbent hydrophilic sponge sheet. Such absorbent layer may be contained either on one surface of the cellular sheet, containing the hydrophilic fiber bundles passing therethrough, or may be contained between two or more such sheets or panels of cellular sponge material. The absorbent layer or layers not only act to hold fluids drawn away from the sponge sheet surface, but also act to spread the absorbed fluids laterally, aiding in their distribution and evaporation of the water contained therein.

In making the absorbent cellular sheet materials of the present invention, a layer or web of hydrophilic fibers is placed on one surface of a sheet of cellular sponge material, and the sheet with the layer of hydrophilic fibers thereon is then needled by passing barbed needles down through the web of fibers into the sponge sheet to force a portion of the fibers, in the form of fiber bundles, through the main body of the underlying sponge. These fiber bundles, passing from the fiber layer down through the sheet sponge material, not only serve to draw fluid into the sponge body but also serve to mechanically interlock the absorbent fiber layer with the cellular sponge sheet, and thus hold the fiber layer in intimate contact with the adjacent cellular sponge material. The ends of the needled fibers which extend through the sheet of cellular sponge material, even though the sponge material itself may be fairly strongly hydrophobic in nature, when wetted with aqueous-base fluids which contact the side of the sponge sheet opposed to the side containing the fiber layer will draw the fluids up through the fiber bundle so formed and through the sheet of sponge material. Some of the fluid remains in the cells in the sponge material immediately adjacent the needled fibers passing through the same. However, most of the fluid is drawn on through the sponge and spread laterally through the web of hydrophilic fibers on the sponge surface.

Any hydrophilic fibers may be used that can be placed in the cellular sponge sheet in such manner as to extend through the sheet and have the ends uncovered by the sponge so that the same can be wetted. In using the term "hydrophilic fibers," those fibers or filaments, including continuous filaments, are included which have the natural property of moving aqueous fluids along their length by capillary action either as single fibers or as fiber bundles, as well as those fibers and filaments which, although normally not wetted by water, have been treated to make the same readily wettable so that they will move aqueous fluids along their surface by capillary action. It is generally preferred to use cellulosic fibers, such as the natural cellulosic fibers, including cotton, ramie, jute, hemp, flax, and bagasse, and the synthetic cellulosic fibers, such as rayon and cellulose acetate.

Any cellular hydrophobic sponge material may be used that is sufficiently flexible and resilient for the purpose intended. The sponge material should, however, not be of such elastic nature that it will overly squeeze the fiber bundles that pass through the same so as to close off small capillary spaces that would otherwise exist between the fibers. It has been found that the rapid movement of fluids from the sponge sheet surface through the same along the fiber bundles is due in large part to the small capillary spaces that exist between the fibers in the bundle, the fluid moving in major part between these fibers by capillary action through wetting the same. These capillary spaces are important in order to obtain the rapid removal of fluids from the surface of the sponge sheet. The fiber bundles may include, with the hydrophilic fibers, other fibers, the surfaces of which are not readily wetted with water, as, for example, some of the non-treated thermoplastic synthetic fibers. These fiber bundles will still act to rapidly remove water from the sponge surface as long as there are sufficient hydrophilic fibers therein to provide such capillary spaces between hydrophobic fibers. Accordingly, where the expression, "fiber bundles formed of hydrophilic fibers," or similar expression, is used in the specification and claims, is is intended to include bundles of hydrophilic fibers containing some non-hydrophilic fibers. Accordingly, the importance of the presence of capillary spaces between the hydrophilic fibers is well illustrated by the fact that if a very live sponge rubber is used, the rubber will retract and press against the fiber bundle after the same has been forced therethrough to squeeze the fibers into intimate contact with each other, thus closing off capillary spaces that would otherwise exist, with the result that aqueous-base fluids move either very slowly along the fiber bundles or their passage is cut off completely. This action is best illustrated by the following table showing the effect of lateral squeeze on the rate of absorbency:

*Table*

| Base Sheet | Thickness, inches | Laminar Strength in Grams of Pull | Time for Full Absorption | Weight in Grams of Fluid Retained After 30 Sec. of Absorption |
|---|---|---|---|---|
| Polyester Type Polyurethane Foam—60 Cells per linear in. | ⅛ | 60 | Less than 5 sec. | 5.84 |
| | | | | 6.84 |
| Polyester Type Polyurethane Foam—45 cells per linear in. | ⅛ | 33 | 2.8 sec | |
| Polyester Type Polyurethane Foam—35 cells per linear in. | ⅛ | 27 | 3.3 sec | 7.40 |
| Polyester Type Polyurethane Foam—25 cells per linear in. | ⅛ | 25 | 3.3 sec | 7.11 |
| Polyether Type Polyurethane Foam. | ⅛ | 41 | 2.2 sec | 6.82 |
| Polyether Type Polyurethane Foam (more dense). | ⅛ | 80 | 3.1 sec | 6.17 |
| Do | ⅛ | 74 | 3.9 sec | 6.62 |
| Light Foam Rubber | ⅛ | 40 | Less than 5 sec. | 8.96 |
| Heavy Sponge Rubber (Kneeling pad). | ⅛ | 205 | Over 10 minutes. | 1.49 |
| Non-foam Neoprene Sheet | ⅛ | 375 | do | 1.45 |
| Sheet of Natural Crepe Rubber (Single Ply). | 1/100 | 63 | 49.1 sec | 5.54 |
| Sheet of Natural Crepe Rubber (Double Ply). | 2/100 | 128 | Over 10 minutes. | 1.85 |

In making the tests, the results of which are tabulated in the above table, a 3 denier, 19/16 inch rayon staple fiber is employed. Base sponge sheet materials of uniform thickness are employed insofar as practical. The thickness of base sheet materials is given. Also included in the tests are non-foamed elastic base sheets to help further illustrate the effect of bundle squeeze. The tightness of squeeze is illustrated by the force required to separate the absorbent fiber layer from the sponge sheet to which it has been needled, the greater force being the result of the greater frictional drag resulting from the squeeze. It will be noted that as the squeeze on the fiber bundles increases, the absorption rate substantially decreases. The test strips are prepared by needling, onto the base sheet, carded fibers of the type indicated to a weight of 2.7 oz. per square yard. The needling of the fibers is done to give 126 fiber bundles per square inch. The ends of the fiber bundles barely protrude from the base sheet surface.

The laminar test is made as follows: test strips of the needled material are cut 1 inch wide and from 10–12 inches in length. The test conditions are maintained at 70° F. and 65% relative humidity. At one end of the test strip, the fiber base and the base sheet are separated for about 1 inch and the strip then placed in a tensile testing machine. This machine then measures the force required to separate the fiber base and the base sheet at a constant jaw separation speed of 2 inches per minute.

The following procedure is used for showing the absorbent capacity: test squares 3 inches x 3 inches are cut from the needled material. The squares are weighed dry and then placed foam surface-bundle end down on a pool of about 20 ml. of distilled water at 24–26° C. No pressure is applied and the time required for the complete wetting of the square is observed. After 30 seconds, the square is held up by one corner to permit draining of excess water absorbed and then weighed. Wet weight minus the dry weight is the "weight retained" indicated in the table. Where the absorption time is over 30 seconds, and the sample is not completely saturated in this time, the test is repeated with another square of the particular material. This test square is permitted to remain in contact with the fluid until saturated or up to ten minutes, whichever period is shorter. Values given as over 10 minutes indicate that saturation is still not obtained at the end of the 10-minute period.

It is generally preferred, in practicing the present invention, to use sponge sheets formed of polyurethane polyethers or polyurethane polyesters, nylon, polyethylene, polyvinyl chloride, and formalinized polyvinyl alcohol, or other materials which will remain resilient and flexible and which are not highly elastic. Although conventional rubber sponges are completely unsatisfactory because of the excessive squeeze exerted by these sponge materials, extremely soft rubber sponge materials, such as open-cellular, low-density sponge sheets having densities of about 0.1 gram per cubic centimeter, may be used. The elasticity or squeeze of such sponge materials is substantially less than conventional rubber sponge materials, which have densities in excess of about 0.3 gram per cubic centimeter. The light foam rubber of the above table is an example of these extremely soft rubber sponge materials, while the heavy sponge rubber of the table is an example of conventional sponge rubber. In general, particularly where the material is to be used for surgical dressings, the sponge sheet should be readily flexible and conforming in sheets of about 1/32–1/2 inch thickness and should be soft and resilient in nature. The material should be sufficiently flexible and conforming to fit over body contours and be sufficiently soft and resilient to act as a protective cushion without irritation, as would a stiff sponge structure. Accordingly, it is generally desired that the sponge material, where the products of the present invention are to be used in dressings, have a flexibility of 17–74% of original thickness and a resiliency of 78–98% of original thickness. The flexibility and resiliency are measured in the following manner. The original thickness is measured with a micrometer having a dead weight of 56.7 grams per square inch of sample. A 500 gram weight is added, and the thickness is read after 60 seconds to find flexibility. The 500 gram weight is removed, and after 60 seconds the thickness is read to find resiliency. Results are expressed in terms of percentage of original thickness.

As an important characteristic of the absorbent materials of the present invention is the relatively dry, non-absorbent surface of the hydrophobic sponge sheet in combination with the fluid-conducting fiber bundles. Accordingly, the bundle ends which act to conduct away fluids from the surface should not exceed in area more than about 50% of the total surface where they are contained, the remainder of the surface being the hydrophobic sponge. Where the absorbent material is to be used as a surgical dressing, the area occupied by the bundle ends should preferably not exceed more than about 10% of the dressing surface.

Although the present invention is not limited to the use of sponge materials that have an open cellular structure and sponge materials having closed cellular structures may be employed, it is generally preferred, particularly where the flexible absorbent materials of the present invention are to be used in contact with the body, that the cellular sponge material used have sufficient open cells to permit the ready passage of air therethrough. Where the sponge material has such open and connecting cellular structure, air can readily reach the surface of a wound where the material is used as a dressing so as to help in healing of the same.

The absorbent materials of the present invention may be used directly as wound dressing materials or they may be incorporated into dressing structures which take advantage of their excellent cushioning and absorbent characteristics.

In order to further illustrate the invention, reference is made to the drawings wherein are set forth, by way of illustration and example, certain embodiments thereof.

Referring to the drawings:

FIG. 1 is a perspective view of an absorbent sheet of the present invention;

FIG. 2 is an enlarged view taken along line 2—2 of FIG. 1;

FIG. 3 is a perspective view illustrating one manner of using the absorbent sheet of FIGS. 1 and 2 as a dressing;

FIG. 4 is a perspective view of another manner of using the absorbent sheet of FIGS. 1 and 2 as a dressing;

FIG. 5 is an enlarged view taken along line 5—5 of FIG. 2 showing a cross-section of a fiber bundle;

FIG. 6 is a cross-sectional view of a different form of absorbent sheet of the present invention;

FIG. 7 is a cross-sectional view of still another form of absorbent sheet of the present invention; and FIG. 8 is a cross-sectional view of still another form of absorbent sheet of the present invention.

Referring to FIG. 1, the absorbent sheet 10 is a composite laminate in which 11 is a flexible sheet of cellular sponge material and 12 is a web of hydrophilic fibers, such, for example, as cotton or rayon fibers. Some of the fibers 19 of the fiber web 12 have been forced down through the sheet 11 of sponge material. These fibers 19 as fiber bundles 13 extend on down through the sponge sheet 11 and extend slightly through the opposite surface 14 as illustrated at 15. The fibers used in forming the fiber webs illustrated in the FIGURES, 1–8, preferably have a fiber length of about 1 to 3 inches and a denier of about 1 to 10. The fibers are pushed down into the sponge sheet 11 through the use of needles containing barbs thereon which catch the fibers and force the same down through the sponge sheet in somewhat of a U configuration, as best illustrated in FIG. 2. In forming these needled products, it is generally preferred that there be at least about 30 needle penetrations per square inch. The downwardly extending fiber bundles 13 not only serve to lock the fiber web onto the sponge sheet 11 but also act to draw fluid through the sponge sheet into the absorbent fiber web 12, some of the fluid also being deposited in some of the adjacent cells 16. Between the fibers 19 of fiber bundles 13, as best illustrated in FIG. 5, there exist small capillary channels or spaces 20. In the center of the fiber bundle, there is a somewhat larger capillary channel 21, formed on removal of the needle used in needling the fibers. As previously described, it is primarily through these channels that the fluid moves.

With an absorbent sheet structure such as illustrated in FIGS. 1 and 2, when the side 14, opposed to the side which carries the fiber web 12, is contacted by an aqueous-base fluid, the protruding ends 15 of the fiber bundles 13 are wetted by the fluid and the fibers 13 and through capillary action draw the fluid up through the sponge sheet even though the sponge material itself is hydrophobic in nature. In passing through the sponge sheet, some of the fluid is deposited in adjacent cells, as previously indicated. Most of the fluid, however, is conducted completely through the sponge sheet and absorbed in the absorbent fiber layer or web 12.

FIG. 3 illustrates one manner in which the absorbent fabric of FIG. 1 may be used as a dressing. In FIG. 3, the absorbent fabric of FIG. 1 is shown as placed on the leg 17 of a patient with the surface 14 against the wound. The dressing is held in place by any conventional means, such as by adhesive strips 18. When used in this manner, body exudate, such as perspiration and secretions from the wound, are rapidly drawn by the fiber bundles 13 up through the sponge sheet 11 and into the absorbent web 12.

As fluids are rapidly wicked into the sponge sheet away from the surface of the skin, and as air can pass through the dressing, both by way of the fibers 13 and because of the porous nature of the sponge material itself where such porous sponge material is used, the skin under the dressing is kept relatively dry, and, at the same time, the dressing itself in contact with the skin feels relatively dry, because of the hydrophobic nature of the sponge sheet, as compared with the conventional gauze dressings where the whole undersurface of the dressing becomes wetted and soggy.

There are times, however, when a wet dressing is desirable, for example, as where it is desired to keep a particular medicament in contact with the wound. Where such is the case, the absorbent material of FIGS. 1 and 2 is used on the wound with the fiber web surface 12 impregnated with the medicament and in contact with the wound and skin as illustrated in FIG. 4. Further medication can be applied by wetting the upper surface of the dressing. The fibers 13 will draw such medication down through the sponge layer 11 and spread the same laterally through the fiber web 12 which is in contact with the patient's body.

In the modification illustrated in FIG. 6, a web 23 of hydrophilic fibers is contained between two sheets 24 and 25 of flexible cellular sponge material. In the particular modification illustrated in FIG. 6, the structure is prepared by first placing a web of hydrophilic fibers of rayon over a sheet 25 of flexible urethane foam sponge. Part of the fibers of the fiber web 23 are then needled into the underlying sponge sheet in the same manner as described in the preparation of the absorbent sheet material of FIG. 1. The second sheet 24 of urethane sponge material is then placed over the needled web 23 of fibers and the composite then needled from the other side so as to force some of the fibers of the web 23 down into the second sheet 24. The fiber bundles 26, which protrude into the cellular sponge sheets 24 and 25, act both to bond the composite fiber web 23 and sponge sheets 24 and 25 together and, at the same time, to draw fluids from the sponge surface into the absorbent fiber layer 23. When either the surface 27 or the surface 28 is brought into contact with an aqueous-base fluid, the fluid is drawn up through the fiber bundles 26 into the absorbent web 23 where it is spread laterally.

The structure shown in FIG. 6 can be modified in accordance with the present invention by having another web of fibers secured to one of the outer surfaces 27 or 28, in which case fluid drawn up into the absorbent structure would not only spread laterally in the fiber web 23 but would also be conducted through the fiber bundles passing through the sponge material into the outer fiber layer.

The structure illustrated in FIG. 6 can be further modified, as illustrated in FIG. 7, by having the fiber bundles which extend from the fiber web 23 extend completely through only one of the sponge sheets, such as sheet 25, but only partially through the second sponge sheet 24, the fibers terminating a short distance from the outer surface 27 of such second sponge sheet. With such a structure, any wound exudate or other fluid drawn up into the fiber layer 23 would remain in its fluid state in such layer and in the extending fibers 26 and adjacent sponge cells, but would not pass on through the surface 27 of sponge sheet 24. Where the sponge is an open-cellular sponge material, ready evaporation through the sponge would take place. However, although moisture vapor would pass on through such a structure and evaporate from the bandage or dressing, the upper portion would not take on an unsightly appearance, as the wound exudate would not pass completely through the dressing.

In FIG. 8, a somewhat further modification is shown. In this modification, the fiber ends 29 and 30 of fibers 31 terminate flush with the surfaces 32 and 33 of the sponge sheet 34. Materials of this type are prepared by first forming a sheet of sponge material with fibers extending down through the same, for example, as in the sponge sheet material of FIG. 1, and then slicing the sheet material along its length to sever both the sponge sheet and the fibers extending therethrough. A product of this type, although rapidly drawing any moisture from one surface to the other, has a substantially fiber-free appearance on the surface that has been so cut with no fibers protruding therefrom. Such products may be applied directly to the wound area and then a conventional absorbent compress or the like placed over the same to absorb wound exudate passing therethrough, or the same may be used primarily as a protective cushion with the conductive fiber bundles acting primarily to conduct perspiration away from the covered skin surface to keep the same substantially dry. If desired, any of the products illustrated may be prepared by slicing through the foam and fiber bundles so as to cause the fiber bundle ends to terminate substantially flush with the sponge sheet surface.

In the preferred practice in making absorbent products of the present invention, after the fiber bundles have been formed in the sponge sheet, the surface with the fiber bundle ends slightly protruding therefrom is ironed by running over the same a smooth heated surface. The temperature of the ironing surface will depend on the particular fibers being used and on the softening temperature of the material of the sponge sheet employed. Where the sponge sheet is of polyurethane foam, the ironing temperature for smoothing is preferably in the order of about 380–420° F. The ironing tends to flatten out protruding fibers to give a smoother, more comfortable wound contacting surface. It also tends to anchor some of the fiber ends by heat bonding to the surface of the sponge sheet, where a thermoplastic sponge sheet material is employed and the ironing temperature is above the softening temperature of the sponge sheet material.

The following specific example with respect to the manufacture of an absorbent product of the type illustrated by FIGS. 1 through 4 will help to further explain the invention. The example, however, is given for the purpose of illustration only and the invention is not limited thereto.

*Example*

A sheet of polyurethane foam is used as the cellular sponge material. This sheet has a thickness of ⅛ inch, a flexibility of 33%, a resiliency of 89%, and a resistance to air flow at 36 cm./sec. of 0.53 inch of water per square inch area. A web of carded rayon fibers having a denier of 3.0 and a fiber length of 1⅛ inch is placed on top of the sheet of polyurethane foam, the fiber web having a weight of 2.6 ounces per square yard.

The sheet of polyurethane foam with the fiber web is passed through a needling machine, each needle having 9 barbs. The needles are made to penetrate the foam sheet and web from the surface containing the web, the barbs on the needles being in such position as to draw fibers down through the sponge sheet, the fibers not extending more than 1/16 inch from the other surface. The needling is carried out to give 184 needle penetrations per square inch.

The product so prepared has a web of rayon fibers on one surface of the sponge sheet and fiber bundles which just penetrate the opposite surface. The product is flexible, resilient, and highly absorbent. The resistance to air flow at 36 cm./sec. is 0.24 inch of water per square inch area, which is less than half the air resistance of the urethane foam alone before needling with the fiber web.

Red-colored, aqueous-base fluid is placed on the side of the product opposite that containing the web of rayon fibers. The fluid is rapidly drawn up into the sponge sheet and spread through the web of rayon fibers. When the absorbent sheet product is cut through the center and examined, it is seen that fluid is also deposited in many of the cells in the sponge adjacent the rayon fibers which pass therethrough. When used as a dressing, blood is drawn through the sponge sheet in the same manner as the red-colored fluid. The dressing is also found to remain flexible and resilient even after blood has dried.

Although the products of the present invention have been described as primarily used in the preparation of dressing materials, that is, materials adapted to be used in contact with the body for protection and the removal of body fluids, the absorbent products have many uses other than as dressing materials, which will be apparent to those reading the present specification. The products of the present invention are accordingly not limited to use for dressing purposes alone. Also, in describing the present invention, certain embodiments have been used, including the presently preferred embodiments, to illustrate the invention and the practice thereof. However, other embodiments and modifications within the spirit of the invention will readily occur to those skilled in the art on reading the same. Although in the specific illustration given, needling is used to form the final sponge product, the products of the present invention may be prepared by any other method whereby fiber bundles, containing capillary spaces between the fibers, are placed within a sheet of cellular sponge material so as to extend through the same and terminate near the surface, the fiber bundle, through capillary action, acting to draw liquid up into and through the sponge sheet. The invention is accordingly not to be limited to the specific embodiments illustrated, these embodiments being used for illustration only, but is to be limited only in accordance with the claims appended hereto.

The present application is a continuation-in-part of application Serial No. 159,117, filed December 13, 1961, and now abandoned.

Having thus described my invention, I claim:

1. An absorbent structure, said structure having at least one surface composed of aqueous-base fluid-transmitting and aqueous-base fluid-nontransmitting areas, said absorbent structure comprising a cellular sponge sheet containing numerous bundles of hydrophilic fibers extending through the same from one side of said sheet to the other side thereof, said fiber bundles containing fluid-conducting capillary channels extending lengthwise of the same and having bundle ends exposed at the surface of said side composed of fluid-transmitting and fluid-nontransmitting areas, said bundle ends forming said fluid-transmitting areas with the sponge sheet surface between said bundle ends forming said fluid-nontransmitting areas, individual fibers making up said fiber bundles containing therebetween small spaces which form said capillary, fluid-conducting channels within said fiber bundles.

2. An absorbent structure of claim 1 in which said cellular sponge sheet is hydrophobic in nature.

3. An absorbent structure of claim 2 in which the major portion of said hydrophilic fibers are cellulose fibers.

4. An absorbent structure of claim 2 in which said sheet of cellular sponge material is a sheet of resilient, flexible polyurethane foam.

5. An absorbent structure of claim 3 in which said cellulosic fibers are regenerated cellulose fibers.

6. An absorbent structure of claim 1 in which the fiber bundle ends have been sheared close to the surface of said cellular sponge sheet.

7. An absorbent structure of claim 1 in which the fiber bundle ends have been ironed down against the surface of the cellular sponge sheet.

8. An absorbent structure, said structure having at least one surface composed of aqueous-base fluid-transmitting and aqueous-base fluid-nontransmitting areas, said absorbent structure comprising a flexible sheet of hydrophobic cellular sponge material containing numerous bundles of hydrophilic fibers extending through the same from one side of said sheet to the other side thereof, said fiber bundles containing fluid-conducting capillary channels extending lengthwise of the same and having ends exposed at the surface of said side composed of fluid-transmitting and fluid-nontransmitting areas, said bundle ends forming said fluid-transmitting areas with the hydrophobic sponge sheet surface between said bundle ends forming said fluid-nontransmitting areas, the fluid-nontransmitting area of said surface being in excess of 50% of the total surface area of said surface, and the individual fibers making up said fiber bundles containing therebetween small spaces which form said capillary, fluid-conducting channels within said fiber bundles.

9. An absorbent structure of claim 8 in which said fiber bundles are in intimate contact with an absorbent laminate and act to conduct aqueous-base fluids to the same.

10. An absorbent structure of claim 9 in which said hydrophobic cellular sponge material is a polyurethane foam.

11. An absorbent structure of claim 10 in which the major portion of said hydrophilic fibers are cellulosic fibers.

12. An absorbent structure, said structure comprising a flexible, resilient sheet of cellular sponge material,
 a web of non-woven hydrophilic fibers on one surface of said sheet of cellular sponge material and,
 fibers extending from said web of non-woven fibers into said sheet of cellular sponge material in the form of fiber bundles, said fibers being uncoated by the material of said sponge and containing small capillary spaces therebetween, and said fiber bundles extending from said web of non-woven fibers through said sheet of cellular sponge material to the opposite side thereof the ends of said fiber bundles being exposed at the surface of said sheet of cellular sponge material to provide fluid-transmitting areas at said surface, said fluid-transmitting areas at said surface comprising substantially less than 50% of said surface and said fiber bundles with the capillary spaces contained therein acting to draw fluids through said sponge sheet to said fiber web, said surface between said bundle ends being fluid-nontransmitting.

13. An absorbent structure of claim 12 in which the sponge material from which said absorbent structure is formed has a flexibility of about 17–74% and a resiliency of 78–98% of original thickness.

14. An absorbent structure of claim 13 in which the fibers forming said fiber bundles are predominantly regenerated cellulose fibers.

15. An absorbent structure of claim 14 in which the fibers of said fiber bundles have a length of 1 to 3 inches and a denier of about 1 to 10.

16. An absorbent structure of claim 15 in which the fiber bundle ends comprising said fluid-absorbing areas do not substantially exceed about 10% of the sponge sheet surface.

17. An absorbent structure comprising a water-absorbent material enclosed within a resilient, flexible cellular sponge, said cellular sponge having fluid-conducting channels extending from said enclosed water-absorbent material through to the outer surface of said cellular structure, said fluid-conducting channels consisting of bundles of hydrophilic fibers containing small capillary spaces therebetween and acting to conduct aqueous-base fluids from said outer surface into said water-absorbing material and said cellular sponge between said fiber bundles being non-fluid-conducting.

18. An absorbent structure of claim 17 in which said water-absorbent material is predominantly cellulosic.

19. An absorbent structure of claim 17 in which said hydrophilic fibers forming said fiber bundles are predominantly cellulosic fibers having a length of about 1 to 3 inches.

20. An absorbent structure of claim 17 in which a substantial proportion of said water-absorbent material is composed of fibers of the type forming said fiber bundles.

References Cited in the file of this patent

UNITED STATES PATENTS

| | | |
|---|---|---|
| 2,077,514 | Callahan | Apr. 20, 1937 |
| 2,429,486 | Reinhardt | Oct. 21, 1947 |
| 2,811,154 | Scholl | Oct. 29, 1957 |
| 2,905,176 | Davidson | Sept. 22, 1959 |
| 3,025,854 | Scholl | Mar. 20, 1962 |
| 3,033,201 | Olsen | May 8, 1962 |

UNITED STATES PATENT OFFICE
CERTIFICATE OF CORRECTION

Patent No. 3,122,142                                  February 25, 1964

George A. Crowe, Jr.

It is hereby certified that error appears in the above numbered patent requiring correction and that the said Letters Patent should read as corrected below.

Column 4, line 8, for "is", second occurrence, read -- it --; line 51, for "19/16 inch" read -- 1 9/16 inch --.

Signed and sealed this 14th day of July 1964.

(SEAL)

Attest:

ESTON G. JOHNSON
Attesting Officer

EDWARD J. BRENNER
Commissioner of Patents